US010260463B2

(12) United States Patent
Ishii et al.

(10) Patent No.: US 10,260,463 B2
(45) Date of Patent: Apr. 16, 2019

(54) MOTORCYCLE INCORPORATING A SUPERCHARGER

(71) Applicant: Kawasaki Jukogyo Kabushiki Kaisha, Kobe-shi, Hyogo (JP)

(72) Inventors: Hiroshi Ishii, Kobe (JP); Daisuke Saeki, Kakogawa (JP); Tomo Yamamoto, Kobe (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 447 days.

(21) Appl. No.: 15/026,929

(22) PCT Filed: Oct. 3, 2013

(86) PCT No.: PCT/JP2013/005905
§ 371 (c)(1),
(2) Date: Apr. 1, 2016

(87) PCT Pub. No.: WO2015/049712
PCT Pub. Date: Apr. 9, 2015

(65) Prior Publication Data
US 2016/0258395 A1    Sep. 8, 2016

(51) Int. Cl.
*B62M 7/02*    (2006.01)
*F02M 35/16*    (2006.01)
(Continued)

(52) U.S. Cl.
CPC ........... *F02M 35/162* (2013.01); *B62J 35/00* (2013.01); *B62K 11/04* (2013.01); *B62M 7/02* (2013.01);
(Continued)

(58) Field of Classification Search
CPC ....... F02M 35/162; B62J 35/00; B62K 11/04; B62M 7/02; F02B 33/44; F02B 39/04
See application file for complete search history.

(56) References Cited

U.S. PATENT DOCUMENTS 4,495,773 A * 1/1985 Inoue ................... B62M 7/02
                                                              180/219
4,735,178 A * 4/1988 Inoue ..................... F02B 33/44
                                                              123/184.48
(Continued)

FOREIGN PATENT DOCUMENTS

JP    S58170628 A    10/1983
JP    S58185930 A    10/1983
(Continued)

OTHER PUBLICATIONS

European Patent Office, Extended European Search Report Issued in European Application No. 13894968.0, dated May 10, 2017, Germany, 7 pages.
(Continued)

*Primary Examiner* — Anne Marie M Boehler
*Assistant Examiner* — Marlon A Arce
(74) *Attorney, Agent, or Firm* — Alleman Hall Creasman & Tuttle LLP (57) ABSTRACT

Provided is a motorcycle incorporating a supercharger which can prevent an increase in a size of a vehicle body. A motorcycle comprises a supercharger which compresses intake air; an air-intake chamber which is placed downstream of the supercharger, stores the intake air compressed in the supercharger, and guides the intake air from the air-intake chamber to a combustion chamber of an engine; a fuel tank placed above the engine, wherein the air-intake chamber is placed between the fuel tank and the engine, and wherein the fuel tank includes a recess-forming section provided with a recess on a bottom surface of the fuel tank (Continued)

in such a manner that the bottom surface of the fuel tank does not interfere with the air-intake chamber.

13 Claims, 5 Drawing Sheets

(51) Int. Cl.
    *B62J 35/00*     (2006.01)
    *B62K 11/04*     (2006.01)
    *F02B 33/44*     (2006.01)
    *F02B 39/04*     (2006.01)
    *F02M 37/14*     (2006.01)

(52) U.S. Cl.
    CPC .............. *F02B 33/44* (2013.01); *F02B 39/04* (2013.01); *F02M 37/14* (2013.01)

(56) References Cited

U.S. PATENT DOCUMENTS 8,857,552 B2 * 10/2014 Oltmans ................. B62J 31/00
                                                                                              180/219

2012/0260896 A1 * 10/2012 Saeki ...................... F02B 33/40
                                                                                               123/559.1
2012/0267182 A1    10/2012 Saeki et al.

FOREIGN PATENT DOCUMENTS

| | | | |
|---|---|---|---|
| JP | S643715 | B2 | 1/1989 |
| JP | 1-40209 | * | 8/1989 |
| JP | H0140209 | B2 | 8/1989 |
| JP | H08207860 | A | 8/1996 |
| WO | 2011077898 | A1 | 6/2011 |

OTHER PUBLICATIONS

ISA Japanese Patent Office, International Search Report Issued in Application No. PCT/JP2013/005905, dated Dec. 24, 2013, WIPO, 1 page.

ISA Japanese Patent Office, Written Opinion of the International Searching Authority Issued in Application No. PCT/JP2013/005905, dated Dec. 24, 2013, WIPO, 5 pages.

* cited by examiner

MOTORCYCLE INCORPORATING A SUPERCHARGER

TECHNICAL FIELD

The present invention relates to a motorcycle incorporating a supercharger which compresses intake air.

BACKGROUND ART

There has been proposed a configuration in which a supercharger is incorporated into a motorcycle (e.g., see Patent Literature 1).

In an exemplary motorcycle incorporating the supercharger, an air-intake passage is provided with an air-intake chamber (corresponding to a pre-chamber of Patent Literature 1) to increase the volume of the air-intake passage.

CITATION LIST

Patent Literature

Patent Literature 1: Japanese Examined Application Publication No. Sho. 64-3715

SUMMARY OF INVENTION

Technical Problem

In the motorcycle, a space formed between an engine and a fuel tank has a limited size. For this reason, the air-intake chamber may increase the size of the vehicle body of the motorcycle.

The present invention is directed to solving the above-described problem, and an object of the present invention is to provide a motorcycle incorporating a supercharger, which can prevent an increase in the size of the vehicle body.

Solution to Problem

According to a first aspect of the present invention, a motorcycle incorporating a supercharger comprises the supercharger which compresses intake air; an air-intake chamber, which is placed downstream of the supercharger, stores the intake air compressed in the supercharger, and guides the intake air from the air-intake chamber to a combustion chamber of an engine; and a fuel tank placed above the engine, wherein the air-intake chamber is placed between the fuel tank and the engine, and wherein the fuel tank includes a recess-forming section provided with a recess at a bottom surface of the fuel tank in such a manner that the bottom surface of the fuel tank does not interfere with the air-intake chamber.

In accordance with this configuration, in a state in which the supercharger and the air-intake chamber are mounted in the motorcycle, at least a portion of the air-intake chamber is located within the recess of the recess-forming section of the fuel tank. This makes it possible to increase the volume of the air-intake chamber and the volume of the fuel tank while preventing an increase in the size of the motorcycle.

The fuel tank may be provided to cover an entire periphery of the air-intake chamber when viewed from above, in a state in which the air-intake chamber is placed in the recess of the recess-forming section. In this configuration, the volume of the air-intake chamber and the volume of the fuel tank can be increased without raising the location at which the fuel tank is placed.

The fuel tank may include a rearward extension section which extends rearward and downward from the recess-forming section, and the rearward extension section may be placed below a seat of the motorcycle. In this configuration, the volume of the air-intake chamber and the volume of the fuel tank can be increased without increasing the size of the motorcycle.

The supercharger may be located in front of the rearward extension section. In this configuration, devices can be laid out properly in the motorcycle, and an increase in the size of the motorcycle can be prevented.

The motorcycle incorporating the supercharger may further comprise a fuel pump which pumps fuel stored in the fuel tank, wherein the fuel pump is accommodated in the fuel tank and placed in a region of the fuel tank which is located rearward relative to the supercharger for the fuel tank. In this configuration, the fuel pump can be placed inside the fuel tank in a location at which the vertical dimension of the fuel pump can be increased, while preventing interference between the fuel pump and the supercharger.

The fuel pump may be placed to be spaced apart from the supercharger in a forward and rearward direction, and a high-heat-resistance component having a heat resistance higher than a heat resistance of the fuel pump, may be placed between the fuel pump and the supercharger. Since the fuel pump is located to be spaced apart from the supercharger, it becomes possible to prevent the heat generated in the supercharger from being transferred to the fuel pump. In addition, since the high-heat-resistance component is placed in a space formed between the fuel pump and the supercharger, the space can be efficiently utilized.

The fuel tank may be configured in such a manner that a lower surface of a front region located in front of the recess-forming section is continuous with a lower surface of a lateral region located on at least one of right and left sides of the recess of the recess-forming section, and a lower surface of the fuel tank may be inclined downward, in a direction from the lower surface of the front region toward the lower surface of the lateral region in a forward and rearward direction. In this configuration, it becomes possible to prevent the fuel from remaining in the front region of the fuel tank, while ensuring the sufficient volume of the fuel pump.

A specified gap may be provided between the fuel tank and the air-intake chamber in the recess of the recess-forming section. In this configuration, an air layer is formed in the gap formed between the fuel tank and the air-intake chamber, and thus it becomes possible to prevent heat transfer from the air-intake chamber to the fuel tank during travelling of the motorcycle.

The above and further objects, features, and advantages of the present invention will more fully be apparent from the following detailed description of a preferred embodiment with reference to the accompanying drawings.

Advantageous Effects of Invention

The present invention is configured as described above, and can obtain an advantage that an increase in the size of the vehicle body can be prevented.

DESCRIPTION OF EMBODIMENTS

Hereinafter, the embodiment of the present invention will be described with reference to the drawings. Throughout the drawings, the same or corresponding components are designated by the same reference symbols and will not be described repeatedly. The directions stated below are from the perspective of a rider straddling the motorcycle.

Figure 1:
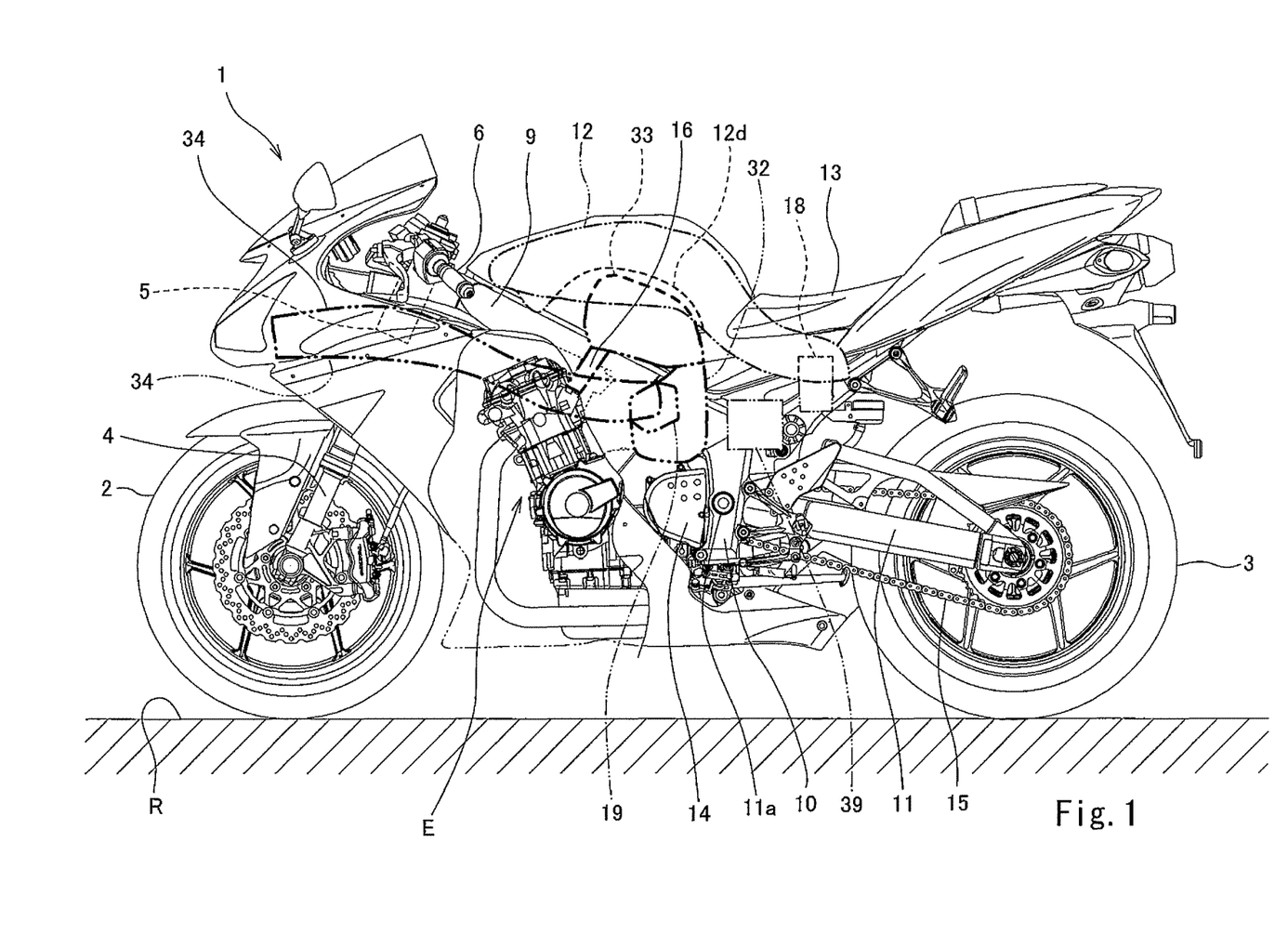
FIG. 1 is a left side view showing a motorcycle according to the embodiment of the present invention.
Figure 2:
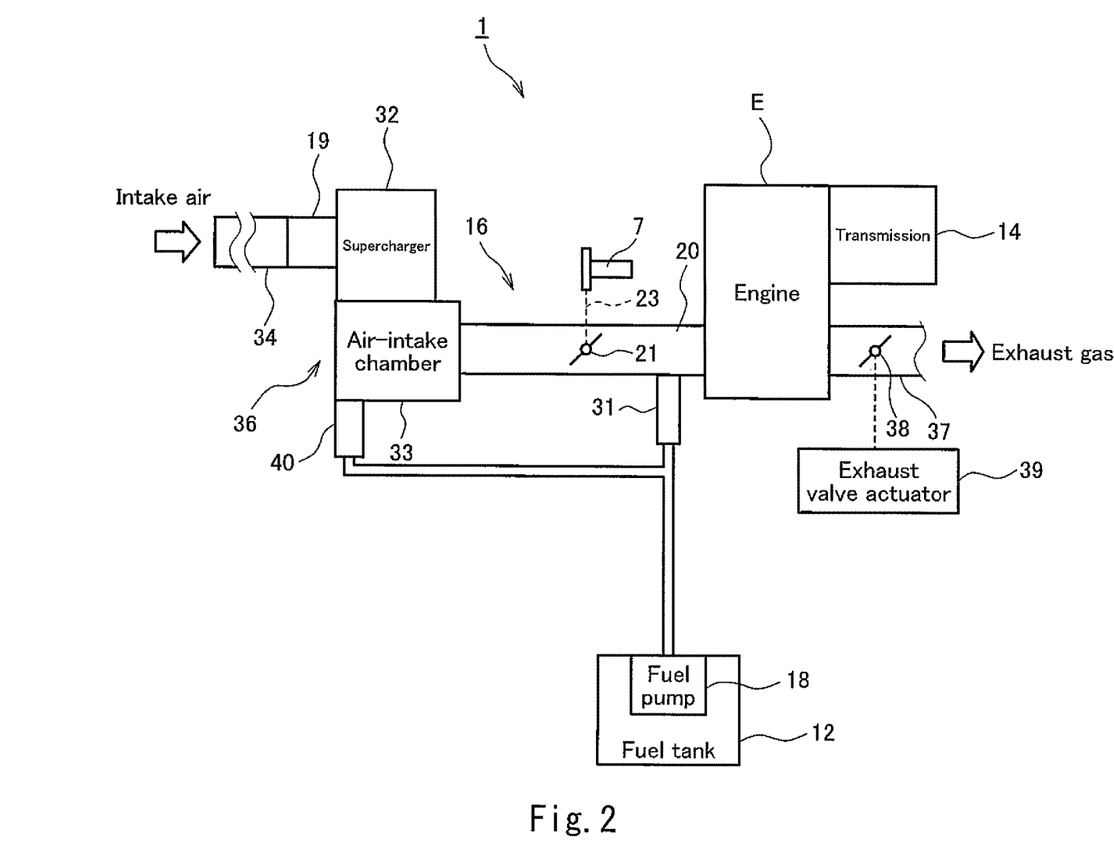
FIG. 2 is a block diagram showing the schematic configuration of the motorcycle of FIG. 1.

FIG. 1 is a left side view showing a motorcycle according to the embodiment of the present invention. FIG. 2 is a block diagram showing the schematic configuration of the motorcycle of FIG. 1. As shown in FIG. 1, a motorcycle 1 includes a front wheel 2 and a rear wheel 3 which roll on a road surface R. The rear wheel 3 is a drive wheel, and the front wheel 2 is a driven wheel. The front wheel 2 is rotatably mounted to the lower end portion of a front fork 4 extending vertically. The front fork 4 is supported on the steering shaft. The steering shaft is rotatably supported by a head pipe 5. A bar-type handle 6 extending in a rightward and leftward direction is attached to an upper bracket.

A throttle grip 7 (see FIG. 2) provided on a portion of the handle 6, which is to be gripped by the rider's right hand, is a throttle input means which is rotated by twisting the rider's wrist to operate a throttle device 16 which will be described later. The rider rotates the handle 6 to turn the front wheel 2 in a desired direction around a steering shaft as a rotary shaft.

A pair of right and left main frames 9 extend rearward from the head pipe 5 in such a manner that the main frames 9 are inclined downward. A pair of right and left pivot frames 10 are connected to the rear portions of the main frames 9, respectively. The front end portion of a swing arm 11 extending substantially in a forward and rearward direction is mounted to the pivot frames 10. The rear wheel 3 is mounted to the rear end portion of the swing arm 11 in such a manner that the rear wheel 3 is pivotable around a pivot shaft 11a. The pivot shaft 11a of the swing arm 11 is placed rearward relative to the rear end portion of an engine E. A fuel tank 12 is placed rearward relative to the handle 6. A seat 13 straddled by the rider is placed rearward relative to the fuel tank 12.

Between the front wheel 2 and the rear wheel 3, the engine E is mounted to the main frames 9 and the pivot frames 10. In the example of FIG. 1, an inline four-cylinder engine including cylinders arranged in a vehicle width direction is shown as the engine E. A transmission 14 (see FIG. 2) is connected to the output shaft of the engine E. Driving power output from the transmission 14 is transmitted to the rear wheel 3 via a chain 15. The engine E and the transmission 14 have a unitary structure including a transmission case of the transmission 14 and a crankcase of the engine E which are arranged in such a manner that the transmission case is located behind the crankcase. When viewed from the side, the axes of the cylinders are inclined forward as they extend upward. When viewed from the side, the crankcase of the engine E and the transmission case of the transmission 14 have a substantially-L shape as a whole. In other words, the engine E and the transmission 14 comprise an L-shaped case. The throttle device 16 is placed inward relative to the main frames 9 and connected to the intake ports (not shown) of the engine E.

An air-intake device 36 is placed upstream of the throttle device 16 and below the fuel tank 12. The air-intake device 36 includes a supercharger 32 which compresses the intake air and an air-intake chamber 33 located downstream of the supercharger 32. An air-intake duct 34, which takes in ram air blowing from the front, and an air cleaner 19, are placed upstream of the supercharger 32 in such a manner that the air cleaner 19 is located between the air-intake duct 34 and the supercharger 32. The intake air taken-in through the air-intake duct 34 is sent to the supercharger 32 via the air cleaner 19. In other words, the supercharger 32 is placed downstream of the air cleaner 19. The supercharger 32 is driven by the driving power of the engine E which is transmitted via a driving power transmission mechanism including gears, the chain, and others, and configured to compress the intake air sent to the supercharger 32. The supercharger 32 includes a centrifugal pump and a planetary gear mechanism, and is configured to increase the speed of the driving power of the engine E. The centrifugal pump and the planetary gear mechanism are placed coaxially. The centrifugal pump and the planetary gear mechanism are pivotally mounted to the upper wall of the transmission case. The supercharger 32 is capable of increasing the output of the motorcycle 1. The intake air which has been compressed by the supercharger 32 is sent to the air-intake chamber 33. The air-intake chamber 33 is configured to store the intake air which has been compressed by the supercharger 32, and guides the air from the air-intake chamber 33 to combustion chambers of the engine E via the throttle device 16. The air-intake chamber 33 serves to suppress a change in a pressure in the interior of an air-intake passage. As the volume of the air-intake chamber 33 is greater, the output of the motorcycle 1 is increased. Instead of using the driving power of the engine E as the driving power for driving the supercharger 32, a driving power source such as a motor may be provided and the supercharger 32 may be driven by driving power generated in the driving power source, or the driving power may be obtained from exhaust energy.

The throttle device 16 includes a throttle valve 21 placed in an intermediate portion of an air-intake pipe 20. The throttle valve 21 is connected to the throttle grip 7 via a throttle wire 23, and is opened or closed in response to the rider's operation of the throttle grip 7. The throttle device 16 is provided with a fuel injection device which injects fuel into the air-intake passage connected to the air-intake pipe 20. In the present embodiment, the fuel injection device includes a main injector 31 placed downstream of the throttle valve 21, and an auxiliary injector 40 placed upstream of the throttle valve 21. The fuel reserved in the fuel tank 12 is supplied to the main injector 31 and to the auxiliary injector 40 by a fuel pump 18. The auxiliary injector 40 is configured to inject the fuel into the interior of the air-intake chamber 33. The transmission 14 changes the driving power of the engine E and transmits the changed driving power to the rear wheel 3. The transmission 14 is provided with a clutch which permits or inhibits the transmission of the driving power from the transmission 14 to the rear wheel 3.

The air which has been used for combustion in the engine E is exhausted through an exhaust pipe 37. An exhaust valve 38 is provided inside the exhaust pipe 37. The exhaust valve 38 is connected to an exhaust valve actuator 39 including a motor which is to be controlled by an engine ECU (not shown). The exhaust valve 38 is driven by the exhaust valve actuator 39 to be opened and closed.

The engine ECU performs calculations associated with engine control based on signals received as inputs from sensors and switches, by electric power supplied from a battery (not shown), and provides control commands to electric devices, respectively. The engine ECU is placed in the interior of a front cowling. The sensors and the switches are, for example, a throttle position sensor, a clutch switch, a gear position sensor, an engine speed sensor, etc.

Figure 3:
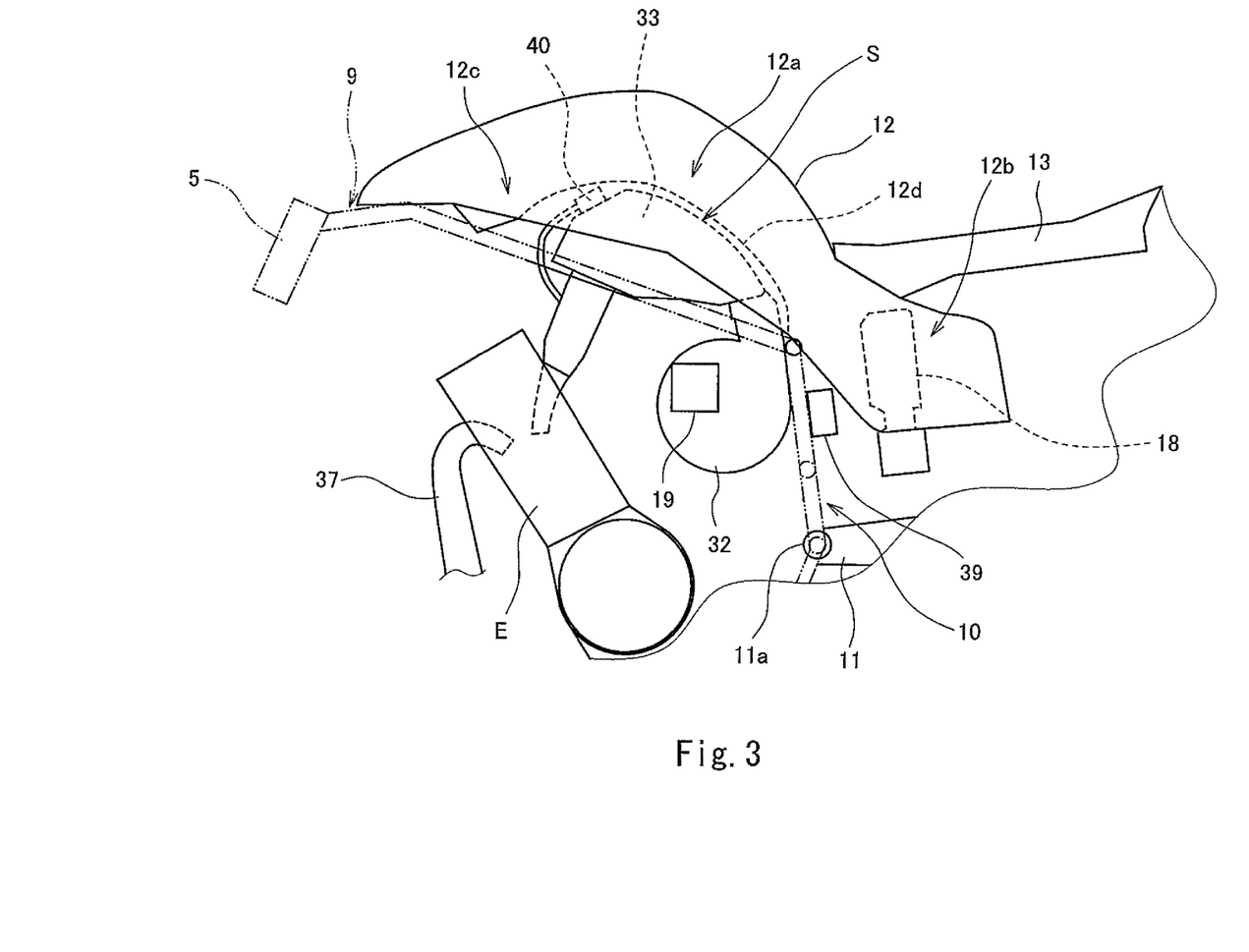
FIG. 3 is a partial left side view schematically showing the exemplary layout of components located in the vicinity of an air-intake device of the motorcycle according to the embodiment.
Figure 4:
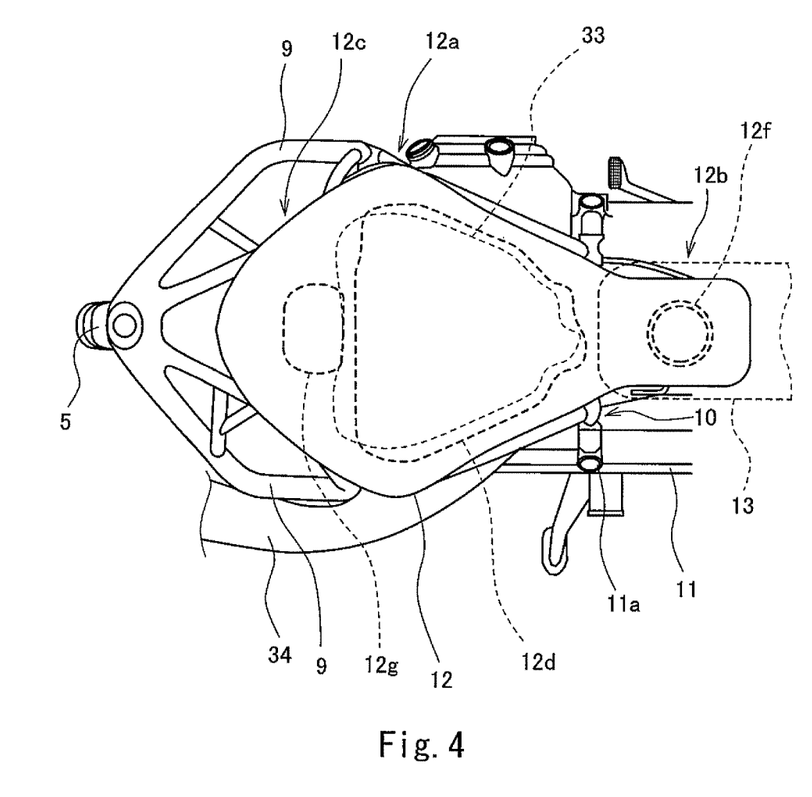
FIG. 4 is a partial plan view schematically showing the exemplary layout of the components located in the vicinity of the air-intake device of the motorcycle according to the embodiment.

Hereinafter, the exemplary layout of the air-intake device 36 and the fuel tank 12 according to the present embodiment will be described more specifically. FIG. 3 is a partial left side view schematically showing the exemplary layout of components located in the vicinity of the air-intake device of the motorcycle according to the embodiment. FIG. 4 is a partial plan view schematically showing the exemplary layout of the components located in the vicinity of the air-intake device of the motorcycle according to the embodiment. In FIGS. 3 and 4, components other than the major components which will be described below are not illustrated.

As shown in FIG. 3, a portion of the fuel tank 12 is located above the main frame 9. The fuel tank 12 extends in the forward and rearward direction, from a region which is in the vicinity of the head pipe 5 to a region which is in the vicinity of the seat 13. The uppermost portion of the fuel tank 12 is located in the intermediate portion of a vehicle body in the forward and rearward direction. Specifically, the uppermost portion of the fuel tank 12 is located rearward relative to the front end portion of the fuel tank 12 and in front of the rear end portion of the fuel tank 12. The uppermost portion of the fuel tank 12 is located to correspond to the uppermost portion of the air-intake chamber 33. The upper surface of the fuel tank 12 has an inclined surface which is inclined downward as the upper surface extends forward and rearward from the uppermost portion. The upper surface of the fuel tank 12 is inclined in the forward and rearward direction and in the rightward and leftward direction as the upper surface extends downward from the uppermost portion. The front end portion of the fuel tank 12 is located in front of the front end portion of the air-intake chamber 33. The fuel tank 12 has a portion located below the cylinder head of the engine E, in a location that is rearward relative to the air-intake chamber 33. This portion is located rearward relative to the rear end portion of the transmission case.

The air-intake chamber 33 is placed between the fuel tank 12 located above the engine E, and the engine E. The air-intake chamber 33 is placed between the fuel tank 12 and the engine E, in the forward and rearward direction, and in a vertical direction. The L-shaped case of the engine E and the transmission 14 is disposed in such a manner that a space is formed rearward relative to the crankcase and above the transmission case. The fuel tank 12 has a circular-arc shape so that a space is formed below the front end portion of the fuel tank 12 and in front of the rear end portion of the fuel tank 12. The L-shaped case and the fuel tank 12 are placed in such a manner that the space of the L-shaped case is connected to the space of the fuel tank 12 to form a common space, while avoiding interference between the space of the L-shaped case and the space of the fuel tank 12. In brief, the L-shaped case and the fuel tank 12 are placed in such a manner that the space is formed above the transmission case, below the front end portion of the fuel tank 12, rearward relative to the crankcase, and in front of the rear end portion of the fuel tank 12. This space has a shape in which its rear side is made lower as the space extends rearward. In this space, the air-intake chamber 33, the supercharger 32, and the throttle device 16 are placed in an air-intake region. In a lower region of the air-intake region, the supercharger 32 and the throttle device 16 are placed. More specifically, the throttle device 16 is placed in the front region of the lower region, while the supercharger 32 is placed in the rear region of the lower region. In the upper region of the air-intake region, the air-intake chamber 33 is placed. The air-intake chamber 33 is curved to conform in shape to the lower surface of the fuel tank 12.

The lower surface of the fuel tank 12 is recessed to conform in shape to the upper surface of the air-intake chamber 33. Specifically, the fuel tank 12 includes a recess-forming section 12a provided with a recess 12d formed in such a manner that the bottom surface of the fuel tank 12 does not interfere with the air-intake chamber 33. Because of this configuration, at least a portion of the air-intake chamber 33 is located in the recess 12d of the recess-forming section 12a of the fuel tank 12, in a state in which the supercharger 32 and the air-intake chamber 33 are mounted in the motorcycle 1. This makes it possible to increase the volume of the fuel tank 12 and the volume of the air-intake chamber 33 without increasing the size of the motorcycle 1.

The dimension in the vehicle width direction and the dimension in the forward and rearward direction of the motorcycle 1 are smaller than those of a four-wheeled vehicle. Even in a motorcycle which does not incorporate the supercharger 32, the space in which the devices are placed is limited. In other words, the flexibility of the design of the layout of the devices mounted in the motorcycle 1 may be low. In particular, in a case where the size of the vehicle body is reduced, the flexibility of the design of the layout of the devices is lower. When the motorcycle 1 in which the flexibility of the design of the layout of the device is low incorporates the above-described configuration of the present embodiment, the volume of the fuel tank 12 and the volume of the air-intake chamber 33 can be increased without increasing the size of the vehicle body. Also, if a motorcycle which does not incorporate a supercharger incorporates the above-described configuration of the present embodiment, the design of the motorcycle can be easily changed to include the supercharger 32 and the air-intake chamber 33.

The fuel tank 12 and the air-intake chamber 33 are placed in a region between the handle 6 and the seat 13 in the forward and rearward direction. Therefore, in a state in which the rider straddles the seat 13, the upper half of the body of the rider is located in this region in which the fuel tank 12 and the air-intake chamber 33 are placed. For this reason, it is difficult to set the upper surface of the vehicle body in this region in a high position. In other words, if the vertical dimension of the air-intake chamber 33 is increased to ensure the sufficient volume of the air-intake chamber 33, it becomes necessary to reduce the vertical dimension of the fuel tank 12 in a location where the fuel tank 12 overlaps with the air-intake chamber 33 when viewed from above.

In light of the above, in the present embodiment, since the fuel tank 12 is provided with the recess 12d formed in such a manner that the bottom surface of the fuel tank 12 does not interfere with the air-intake chamber 33, at least a portion of a region of the fuel tank 12, the region being adjacent to the air-intake chamber 33, extends to a location which is below the upper surface of the air-intake chamber 33. This makes it possible to increase the volume of the fuel tank 12 and the volume of the air-intake chamber 33 without raising the height position of the upper surface of the vehicle body, in the region where the upper half of the body of the rider is located. As a result, a distance over which the motorcycle 1 can travel without an external oil supply can be increased while increasing the output of the motorcycle 1.

The region of the fuel tank 12, extending to the location which is below the upper surface of the air-intake chamber 33, is located in at least one of regions which are located in front of the recess 12d (and the air-intake chamber 33 located in the recess 12d), rearward relative to the recess 12d, and on the right and left sides of the recess 12d. In the present embodiment, as shown in FIG. 4, the fuel tank 12 is configured to cover the entire periphery of the air-intake chamber 33 when viewed from above, in the state in which the air-intake chamber 33 is placed in the recess 12d of the recess-forming section 12a. In this configuration, it becomes possible to ensure the sufficient volume of the air-intake chamber 33 and the sufficient volume of the fuel tank 12, without raising the height position of the fuel tank 12. In addition, it becomes possible to prevent the air-intake chamber 33 from being exposed to the outside of the fuel tank 12.

The recess 12d of the recess-forming section 12a has a shape conforming to that of the air-intake chamber 33 located within the recess 12d. In the recess 12d of the recess-forming section 12a, a specified gap S is formed between the fuel tank 12 and the air-intake chamber 33. In this configuration, an air layer, preferably an air flow (ram air), is formed in the gap S between the fuel tank 12 and the air-intake chamber 33 during travelling of the motorcycle 1. This makes it possible to prevent heat transfer from the air-intake chamber 33 to the fuel tank 12. In addition to or instead of this, a heat insulating member may be interposed between the fuel tank 12 and the air-intake chamber 33. In this case, the heat insulating member is attached to, for example, the fuel tank 12.

As shown in FIGS. 3 and 4, in the present embodiment, the fuel tank 12 includes a rearward extension section 12b extending rearward and downward from the recess-forming section 12a. The rearward extension section 12b is located below the seat 13 of the motorcycle 1. More specifically, the rear end portion of the fuel tank 12 is located below and rearward relative to the front end portion of the seat 13. In this configuration, the spatial volume of the air-intake chamber 33 and the volume of the fuel tank 12 can be increased without increasing the size of the motorcycle 1. In other words, even when the size of the air-intake chamber 33 is increased, the volume of a portion of the fuel tank 12 which is rearward relative to the air-intake chamber 33 can be increased. The rearward extension section 12b is configured as the lowermost portion of the fuel tank 12. Therefore, when viewed from above, the location of the motorcycle 1 at which the rider straddles the seat 13 overlaps with the lowermost portion of the fuel tank 12. For this reason, the center of gravity of the fuel tank 12 is located in the vicinity of the location at which the rider straddles the seat 13, irrespective of a change in the amount of the fuel stored in the fuel tank 12. Thus, the center of gravity of the motorcycle 1 can be stabilized irrespective of the amount of the fuel stored in the fuel tank 12. Further, even when a load directed in the forward and rearward direction is applied to the motorcycle 1 during travelling of the motorcycle 1, the fuel is always reserved in the rearward extension section 12b which is the lowermost portion of the fuel tank 12 (the amount of the fuel moving horizontally is less). Therefore, a weight balance can be maintained favorably during travelling of the motorcycle 1, and excellent mobility can be obtained. The lowermost portion of the fuel tank 12 has a horizontal surface. The upper surface of the air-intake chamber 33 is located above the lowermost portion of the fuel tank 12. The lowermost portion of the fuel tank 12 is located rearward relative to the air-intake chamber 33. Therefore, the shape of the bottom surface of the fuel tank 12 can be determined irrespective of the shape of the air-intake chamber 33, and the horizontal surface can be easily formed in the lowermost portion of the fuel tank 12. Further, the lowermost portion of the fuel tank 12 is located below the cylinder head of the engine E and the lower end portion of the air-intake chamber 33. The horizontal surface of the lowermost portion of the fuel tank 12 is located in the vicinity of the height position of the upper surface of the transmission case, in a location that is rearward relative to the transmission case.

The fuel tank 12 is provided with a fuel pump 18 which pumps the fuel. The fuel pump 18 is accommodated in the fuel tank 12, and placed in the region of the fuel tank 12 which is located rearward relative to the supercharger 32. Specifically, the fuel pump 18 is provided on the lower end portion of the rearward extension section 12b of the fuel tank 12. In other words, a fuel discharge port 12f (see FIG. 5 which will be described later) of the fuel tank 12 is provided on the horizontal surface (lowermost surface) of the lower end portion of the rearward extension section 12b. In this way, the fuel pump 18 is placed to be spaced apart in the forward and rearward direction from the supercharger 32. This makes it possible to position the fuel pump 18 inside the fuel tank 12 so that the vertical dimension of the fuel pump 18 can be increased while preventing interference between the fuel pump 18 and the supercharger 32 (the fuel pump 18 is positioned to be spaced apart from the engine E and the air-intake device 36). Since the fuel pump 18 is located to be spaced apart from the supercharger 32, it becomes possible to prevent the heat generated in the supercharger 32 from being transferred to the fuel pump 18. The fuel pump 18 is located in the lower portion of the rearward extension section 12b, and below the seat 13. Since the fuel pump 18 is close to the location at which the rider straddles the seat 13, the weight balance of the motorcycle 1 can be stabilized in a state in which the rider is straddling the seat 13. The fuel pump 18 is located rearward relative to the pivot shaft 11a of the swing arm 11.

Further, between the fuel pump 18 and the supercharger 32, a high-heat-resistance component having a heat resistance higher than that of the fuel pump 18 is placed. For example, the high-heat-resistance component is an actuator such as an exhaust valve actuator 39, or a sensor. Since the high-heat-resistance component is placed in the space formed between the fuel pump 18 and the supercharger 32, the space can be efficiently utilized. In the present embodiment, the exhaust valve actuator 39 is placed to overlap with the pivot shaft 11a of the swing arm 11, when viewed from above. The exhaust valve 38 (FIG. 2) is placed in the vicinity of the pivot shaft 11a of the swing arm 11 in the forward and rearward direction. This makes it possible to shorten a wire connecting the exhaust valve actuator 39 to the exhaust valve 38.

As shown in FIG. 4, in the present embodiment, the pair of right and left main frames 9 have an increased-space region which increases in an obliquely rearward direction the dimension of the space formed between the right and left main frames, from the head pipe 5 toward a maximum-space region of the main frames 9. In this increased-space region, the engine E, the fuel tank 12, the supercharger 32, and the air-intake chamber 33 are placed. Since the air-intake chamber 33 and the fuel tank 12 are placed in a wide space formed in the center portion of the vehicle body in the rightward and leftward direction, as described above, the air-intake chamber 33 and the fuel tank 12 can be placed easily, and their volumes can be increased, while preventing the air-intake chamber 33 and the fuel tank 12 from interfering with the main frames 9. Since the pair of right and left main frames 9 are placed on the right and left sides of the engine E, respectively, the volume of the fuel tank 12 and the volume of the air-intake chamber 33 can be increased, compared to a case where the main frames extend through the inside region of the vehicle body. A portion of wire harness electrically connecting the electric components to each other or the electric components to the engine ECU 17 is placed between the pair of right and left main frames 9 and covered by the fuel tank 12. In the same manner, a portion of a path (blow-off path) for releasing a surplus pressure in the supercharger 32 may be covered by the fuel tank 12.

As shown in FIGS. 1 and 4, in the present embodiment, the air-intake duct 34 is placed to be offset on a first side (in the example of FIG. 4, the left side) in the rightward and leftward direction. Specifically, the air-intake duct 34 extends through the lateral region of the engine E. Correspondingly, the inlet (air inlet) of the air-intake duct 34 is provided to be offset on the first side in the rightward and leftward direction. In this configuration, in a region above the engine E, the space in which the air-intake chamber 33 and the fuel tank 12 are placed can be increased without raising the height position of the upper region of the vehicle body where the upper half part of the rider is located, compared to a configuration in which the air-intake duct extends above the engine E.

In a configuration in which the air-intake duct is placed at the center portion of the vehicle body in the rightward and leftward direction, as a comparative example, there arises a need for a space in which the air-intake duct and the air cleaner are placed, between the fuel tank and the head pipe. For this reason, in the space of the comparative example, the front portion of the fuel tank is required to be recessed to avoid interference with the air-intake duct and the air cleaner. In this configuration, the volume of the fuel tank cannot be increased.

In contrast, in the present embodiment, the air-intake duct 34 is placed to extend from a region which is outward in the rightward and leftward direction relative to the fuel tank 12 to a region which is below the fuel tank 12 while avoiding interference between the air-intake duct 34 and the fuel tank 12. This can eliminate a need to recess a portion of the fuel tank 12 to form the space in which the air-intake duct 34 is placed. As a result, the volume of the fuel tank 12 can be increased.

The air cleaner 19 is provided separately from the air-intake chamber 33. Specifically, as described above, the air cleaner 19 is placed upstream (lateral) of the supercharger 32. In this layout, as shown in FIG. 3, the air cleaner 19 is located below the lower surface of the fuel tank 12. In this structure, it is not necessary to recess a portion of the fuel tank 12 to form the space in which the air cleaner 19 is placed. Alternatively, the air cleaner 19 may be placed inside the air-intake duct 34 or upstream of the air-intake duct 34.

The supercharger 32 is placed in front of the rearward extension section 12b of the fuel tank 12 and below the recess-forming section 12a of the fuel tank 12. Also, the supercharger 32 is placed rearward relative to the engine E. More specifically, the supercharger 32 is located rearward relative to the crankcase of the engine E and above the transmission case. The supercharger 32 is placed below the upper end portion (cylinder head cover) of the engine E. The supercharger 32 is placed in front of the rear end portion of the transmission case. More specifically, the supercharger 32 is supported on the upper wall portion of the transmission case. Between the supercharger 32 and the crankcase, a specified gap extending in the forward and rearward direction is provided. This makes it possible to properly lay out the devices in the motorcycle 1, and prevent an increase in the size of the motorcycle 1. The supercharger 32 is placed at the center portion of the vehicle body in the vehicle width direction. This makes it possible to prevent an increase in the size of the fuel tank 12 in the vehicle width direction and an increase in the size of the air-intake chamber 33 in the vehicle width direction. Since the supercharger 32 is located in the vicinity of the crankcase of the engine E, the structure of a driving power transmission mechanism which transmits the driving power of the engine E can be simplified, and the length of the driving power transmission mechanism can be reduced. The outlet of the supercharger 32 faces upward. In the present embodiment, as described above, since the supercharger 32 is driven by the rotational driving power of the engine E, the supercharger 32 is placed in the vicinity of the engine E. Therefore, the air-intake chamber 33 which is subsequent to the supercharger 32 is placed at a relatively high position on the vehicle body. In this case, by recessing the lower surface of the fuel tank 12 and placing the fuel tank 12 and the air-intake chamber 33 in such a manner that the fuel tank 12 and the air-intake chamber 33 overlap with each other when viewed from the side, the volume of the fuel tank 12 and the volume of the air-intake chamber 33 can be increased while preventing an increase in the size of the vehicle body.

The inlet of the air-intake chamber 33 which is connected to the outlet of the supercharger 22 is provided at the lower end portion and rear end portion of the air-intake chamber 33. The air-intake chamber 33 is configured to take in the intake air in a forward direction and an upward direction through the inlet. In other words, the air-intake chamber 33 is placed to extend forward and upward from the upper side of the supercharger 22. Therefore, in an air path in a region where the supercharger 32 and the air-intake chamber 33 are connected to each other has a structure for changing the direction (upward direction) of the air output from the supercharger 32 into an obliquely upward direction in the interior of the air-intake chamber 33. This makes it possible to easily place the air-intake chamber 33 with a great volume above the engine E, while making the supercharger 32 close to the crankcase provided on the lower portion of the engine E. The outlet of the air-intake chamber 33 is provided on the lower surface of the front portion of the air-intake chamber 33 and is connected to the air-intake pipe 20. The air-intake chamber 33 is placed above the throttle device 16. The air-intake chamber 33 is placed at the center portion of the vehicle body in the vehicle width direction.

The air-intake device 36 is placed to take in the intake air from the rear of the engine E. In this configuration, the space in which the air-intake chamber 33 and the fuel tank 12 are placed can be formed above the engine E. In other words, by properly laying out the air-intake device 36 and the fuel tank 12, an increase in the size of the motorcycle 1 can be prevented.

It is expected that the output of the motorcycle 1 incorporating the supercharger can be increased as the volume of the air-intake chamber 33 is increased. For example, in terms of the output of the motorcycle 1, the volume of the air-intake chamber 33 is set to be more than twice as large as the displacement of the engine E, or more preferably, more than five times as large as the displacement of the engine E.

In the present embodiment, the air-intake chamber 33 has a shape in which its vertical dimension is increased as the air-intake chamber 33 extends forward. The air-intake chamber 33 also has a shape in which the width (distance between inner walls in the rightward and leftward direction in the interior of the air-intake chamber 33) of the inner space in an outlet region is greater than the width of the inner space in an inlet region. To conform to this shape, the contour of the air-intake chamber 33 and the contour of the recess-forming section 12a of the fuel tank 12 have a sector shape in which the dimension (width) in the rightward and leftward direction is decreased as the air-intake chamber 33 and the recess-forming section 12a extend rearward, as shown in FIG. 4. This can reduce the width of a portion of the vehicle body, which is in front of the knees of the rider straddling the vehicle body. As a result, the rider can easily grip the vehicle body with the knees.

Figure 5:
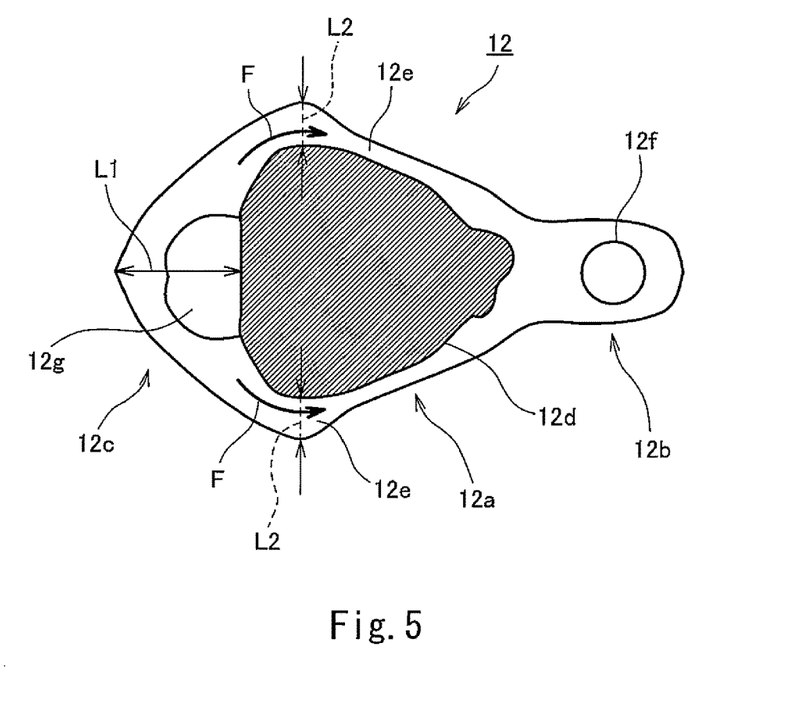
FIG. 5 is a view showing a fuel tank according to the embodiment in a state in which the fuel tank is mounted in the motorcycle, when viewed from below.
Figure 6:
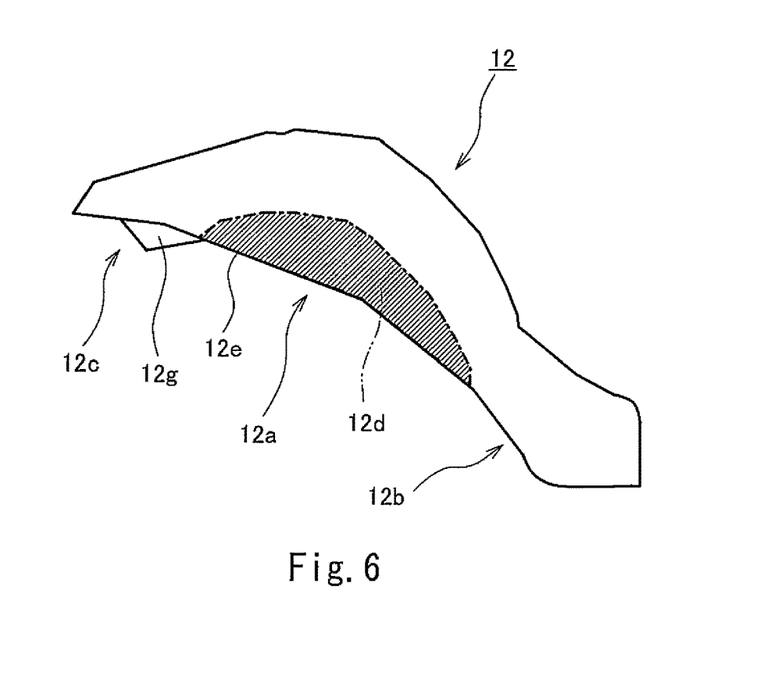
FIG. 6 is a view showing the fuel tank of FIG. 5, in a state in which the fuel tank is mounted in the motorcycle, when viewed from the left.

FIG. 5 is a view showing the fuel tank 12 according to the embodiment in a state in which the fuel tank 12 is mounted in the motorcycle, when viewed from below. FIG. 6 is a view showing the fuel tank 12 of FIG. 5, in a state in which the fuel tank 12 is mounted in the motorcycle, when viewed from the left. In FIGS. 5 and 6, the left side is the front side of the vehicle body.

In the present embodiment, as shown in FIGS. 3 to 6, the fuel tank 12 includes a forward extension direction 12c extended forward from the recess-forming section 12a. The lower surface of the front end portion of the forward extension section 12c is located in the vicinity of the head pipe 5. In this way, the forward extension section 12c is placed in the space formed by placing the air-intake duct 34 and the air cleaner 19 in the lateral region of the vehicle body in the rightward and leftward direction. This can further increase the volume of the fuel tank 12. A region (downward extension region) 12g of at least a portion of the bottom surface of the forward extension section 12c has a swelling shape in which the lower surface of the downward extension region 12g is located to be lower than the bottom side of the recess 12d of the recess-forming section 12a. In other words, the center portion of the downward extension region 12g, in the rightward and leftward direction of the forward extension section 12c, swells to a location which is below the bottom surface of the remaining region of the downward extension region 12g. As shown in FIGS. 3 and 4, the front side and rear side of the air-intake chamber 33 are covered by the forward extension section 12c and the rearward extension section 12b of the fuel tank 12, respectively.

As shown in FIG. 5, a non-recess region 12e is formed on at least one of the right and left sides of the recess 12d of the recess-forming section 12a of the fuel tank 12. In the present embodiment, the non-recess regions 12e are formed on the right and left sides of the recess 12d. At least portions of the non-recess regions 12e are located below the upper surface of the air-intake chamber 33. The fuel tank 12 is configured in such a manner that the lower surface of the front region (forward extension section 12c) which is located in front of the recess-forming section 12a is continuous with the lower surface of the lateral region (the non-recess region 12e) located on at least one of the right and left sides of the recess 12d of the recess-forming section 12a. As shown in FIG. 6, the lower surface of the fuel tank 12 is inclined downward, in a direction from the lower surface of the forward extension section 12c toward the lower surface of the non-recess region 12e in the forward and rearward direction.

The movement of the fuel present in the rear region of the fuel tank 12 to the forward extension section 12c is suppressed by the presence of the recess 12d of the recess-forming section 12a. Fluid passages F are formed in the lateral regions of the recess 12d in the recess-forming section 12a to allow the fuel to flow smoothly from the forward extension section 12c to the rear region of the fuel tank 12. This makes it possible to prevent the fuel from remaining in the forward extension section 12c. As shown in FIG. 5, when viewed from above, a length L1 in the forward and rearward direction, between the front end portion of the recess 12d and the front end portion of the forward extension section 12c, is greater than a length L2 in the rightward and leftward direction, between the right or left end portion of the recess 12d, which is closer to the non-recess region 12e, and the outer end portion of the non-recess region 12e. This also makes it possible to increase the volume of the forward extension section 12c. Further, the back flow of the fuel toward the forward extension section 12c can be prevented more effectively while realizing the favorable flow from the forward extension section 12c to the rear region of the fuel tank 12.

A device other than the air-intake chamber 33 may be placed within the recess 12d of the recess-forming section 12a of the fuel tank 12. For example, an air-intake pressure sensor for detecting an air pressure in the interior of the air-intake chamber 33 may be placed within the recess 12d. As shown in FIG. 3, the auxiliary injector 40 may be placed within the recess 12d, in front of the air-intake chamber 33. For example, the auxiliary injector 40 is supported on the upper surface of the air-intake chamber 33. The upper surface of the air-intake chamber 33 has an inclined surface which is more distant from the recess 12d, as the upper surface of the air-intake chamber 33 extends forward from a specified position within the recess 12d. The auxiliary injector 40 is attached to this inclined surface in such a manner that the auxiliary injector 40 is placed in a space formed between the recess 12d and the inclined surface. The auxiliary injector 40 is placed in such a manner that the axis of the fuel discharge port is perpendicular to the inclined surface of the air-intake chamber 33 in a state in which the auxiliary injector 40 is supported on the inclined surface of the air-intake chamber 33. Thus, the auxiliary injector 40 is placed in such a manner that its axis is inclined with respect to a vertical axis. This can reduce the height of the auxiliary injector 40 in the vertical direction. As a result, the volume of the recess 12d of the fuel tank 12 which is formed for the auxiliary injector 40 can be reduced, and the volume of the fuel tank 12 can be increased.

The recess 12d of the recess-forming section 12a has a shape conforming to that of the devices including the air-intake chamber 33 placed in the recess 12d. The rear end portion of the recess 12d of the recess-forming section 12a has a shape conforming to that of the connection portion at which the air-intake chamber 33 and the supercharger 32 are connected to each other. The rear end portion of the recess 12d has a shape conforming to that of the upper portion (casing) of the supercharger 32. In this structure, the fuel tank 12 can be placed to be closer to the supercharger 32 and the air-intake chamber 33, and the height of the fuel tank 12 can be reduced.

Numerous improvements and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

INDUSTRIAL APPLICABILITY

A motorcycle incorporating a supercharger of the present invention can effectively prevent an increase in a size of a vehicle body.

LIST OF REFERENCE CHARACTERS 1 motorcycle
12 fuel tank
12a recess-forming section
12b rearward extension section
12c forward extension section
12d recess
12g downward extension section
13 seat
18 fuel pump
33 air-intake chamber
34 air-intake duct

The invention claimed is:

1. A motorcycle incorporating a supercharger, the motorcycle comprising:
the supercharger which compresses intake air;
an air-intake chamber which is placed downstream of the supercharger, stores the intake air compressed in the supercharger, and guides the intake air from the air-intake chamber to a combustion chamber of an engine; and
a fuel tank placed above the engine,
wherein the air-intake chamber is placed between the fuel tank and the engine, and
wherein the fuel tank includes a recess-forming section provided with a recess at a bottom surface of the fuel tank in such a manner that the bottom surface of the fuel tank does not interfere with the air-intake chamber, and a rearward extension section which extends rearward and downward from the recess-forming section,
wherein the rearward extension section is placed below a seat of the motorcycle, and
wherein the rearward extension section includes a portion located below a cylinder head of the engine in a location which is rearward relative to the air-intake chamber.

2. The motorcycle incorporating the supercharger according to claim 1,
wherein the fuel tank is provided to cover an entire periphery of the air-intake chamber when viewed from above, in a state in which the air-intake chamber is placed in the recess of the recess-forming section.

3. The motorcycle incorporating the supercharger according to claim 1,
wherein the supercharger is located in front of the rearward extension section.

4. The motorcycle incorporating the supercharger according to claim 1, further comprising:
a fuel pump which pumps fuel stored in the fuel tank,
wherein the fuel pump is accommodated in the fuel tank and placed in a region of the fuel tank which is located rearward relative to the supercharger.

5. The motorcycle incorporating the supercharger according to claim 1,
wherein the fuel tank is configured in such a manner that a lower surface of a front region located in front of the recess-forming section is continuous with a lower surface of a lateral region located on at least one of right and left sides of the recess of the recess-forming section, and a lower surface of the fuel tank is inclined downward, in a direction from the lower surface of the front region toward the lower surface of the lateral region, in a forward and rearward direction.

6. The motorcycle incorporating the supercharger according to claim 1,
wherein a specified gap is provided between the fuel tank and the air-intake chamber in the recess of the recess-forming section.

7. The motorcycle incorporating the supercharger according to claim 1,
wherein the supercharger is placed rearward relative to a crankcase of the engine, and
wherein the recess-forming section has a shape conforming to a shape of a connection portion at which the air-intake chamber and the supercharger are connected to each other.

8. The motorcycle incorporating the supercharger according to claim 1,
wherein an upper surface of the air-intake chamber has a curved surface protruding upward.

9. The motorcycle incorporating the supercharger according to claim 1,
wherein an upper end portion of the supercharger is located above a lower end portion of the fuel tank.

10. The motorcycle incorporating the supercharger according to claim 9,
wherein the supercharger is placed in such a manner that an inlet of the supercharger faces a side surface of a vehicle body.

11. The motorcycle incorporating the supercharger according to claim 1, comprising:
an L-shaped case which has a unitary structure including a crankcase of the engine and a transmission case of a transmission which are arranged in such a manner that the transmission case is located behind the crankcase,
wherein the supercharger is placed above the transmission case and is driven by driving power generated in the engine.

12. A motorcycle incorporating a supercharger, the motorcycle comprising:
the supercharger which compresses intake air;
an air-intake chamber which is placed downstream of the supercharger, stores the intake air compressed in the supercharger, and guides the intake air from the air-intake chamber to a combustion chamber of an engine;
a fuel tank placed above the engine; and
a fuel pump which pumps fuel stored in the fuel tank,
wherein the air-intake chamber is placed between the fuel tank and the engine,
wherein the fuel tank includes a recess-forming section provided with a recess at a bottom surface of the fuel tank in such a manner that the bottom surface of the fuel tank does not interfere with the air-intake chamber, and a rearward extension section which extends rearward and downward from the recess-forming section, wherein the rearward extension section is placed below a seat of the motorcycle, wherein the fuel pump is accommodated in the fuel tank and placed in a region of the fuel tank which is located rearward relative to the supercharger, wherein the fuel pump is placed to be spaced apart from the supercharger in a forward and rearward direction, and wherein a high-heat-resistance component having a heat resistance higher than a heat resistance of the fuel pump, is placed between the fuel pump and the supercharger.

13. A motorcycle incorporating a supercharger, the motorcycle comprising:

the supercharger which compresses intake air;

an air-intake chamber which is placed downstream of the supercharger, stores the intake air compressed in the supercharger, and guides the intake air from the air-intake chamber to a combustion chamber of an engine; and a fuel tank placed above the engine, wherein the air-intake chamber is placed between the fuel tank and the engine, and wherein the fuel tank includes a recess-forming section provided with a recess at a bottom surface of the fuel tank in such a manner that the bottom surface of the fuel tank does not interfere with the air-intake chamber, and a rearward extension section which extends rearward and downward from the recess-forming section, wherein the rearward extension section is placed below a seat of the motorcycle, wherein a specified gap is provided between the fuel tank and the air-intake chamber in the recess of the recess-forming section, and wherein the air-intake chamber includes an inlet provided on a rear end portion thereof and an outlet provided in front of the rear end portion.

* * * * *